TRAPPED ELECTROMAGNETIC RADIATION COMMUNICATIONS SYSTEM

Original Filed Sept. 11, 1963

INVENTORS
MARIO D. GROSSI
PIETRO P. LOMBARDINI
BY Donald Brown
AGENT

INVENTORS
MARIO D. GROSSI
PIETRO P. LOMBARDINI
BY Donald Brown
AGENT

INVENTORS
MARIO D. GROSSI
PIETRO P. LOMBARDINI
BY Donald Brown
AGENT

INVENTORS
MARIO D. GROSSI
PIETRO P. LOMBARDINI
BY Donald Brown
AGENT

United States Patent Office 3,445,844
Patented May 20, 1969

3,445,844
TRAPPED ELECTROMAGNETIC RADIATION COMMUNICATIONS SYSTEM

Mario D. Grossi, Cambridge, Mass., and Pietro P. Lombardini, Philadelphia, Pa., assignors to Raytheon Company, Lexington, Mass., a corporation of Delaware Continuation of application Ser. No. 308,172, Sept. 11, 1963. This application Jan. 11, 1968, Ser. No. 697,244
Int. Cl. H04b 7/00
U.S. Cl. 343—100 57 Claims This invention relates to communication systems and more particularly to the use of trapped electromagnetic radiation to provide an over the horizon long distance communications network or system.

This application is a continuation of application Ser. No. 308,172 filed Sept. 11, 1963, now abandoned.

Ever since the advent of the radio, various attempts have been made to provide a long range communications system. During the World War I era attempts were made to obtain a reliable world wide communications system utilizing very low frequencies, but due to atmospheric noises and bandwidth limitations, more desirable techniques were required. In more recent years, radio propagation over long distances has been attempted by systems employing "one hop" or "bounce" reflective techniques for scattering V.H.F., U.H.F., and S.H.F. signals. These particular systems have required the use of large amounts of power in order to obtain reception at distant points. Additionally, scattering techniques have suffered from the occurrence of atmospheric instabilities which have caused periodic fading of the transmitted signals. Although scattering techniques have been applied successfully over relatively short distances, such as between the continent of Europe and islands in the Mediterranean, and additionally in Alaska and Northern Canada, long distance communications have not been possible.

Other global communication systems not relying on ground based links have also been attempted. For example, the Telstar orbiting satellite and the orbiting satellite communications system have been proposed as a solution to this problem. Although Telstar has proved that a global communication system is feasible, utilizing an orbiting satellite or a group of orbiting satellites, these systems are quite costly, particularly due to the requirement of at least forty orbiting satellites in order to obtain coverage of the entire world. Additionally, problems of reliability of the repeater equipment utnlized in the satellites will necessitate that additional repeater satellites be periodically placed in orbit as a substitute for an inoperable satellite. Additionally, these satellite systems rely on basically a "one hop" line-of-sight technique between two points, and thus forty satellites are required as a minimum for complete world wide coverage.

Further, "one hop" reflective long distance communication systems have been proposed utilizing a ground created reflective zone or layer of an ionized atmosphere. This reflective layer could be obtained using seeding techniques or possibly by the injection of neutrons to form a reflective cloud in the atmosphere. In spite of the fact that communications have been successfully attempted utilizing seeding for "one hop" point-to-point over the horizon reflective communications links, seeded ionized clouds have been difficult to control, particularly due to the sun's adverse effect. Although all the aforementioned systems have had some success, either their cost or complexity has produced a requirement for a more inexpensive and reliable system to obtain world wide communications.

Accordingly, it is the principal object of this invention to provide a new, useful, and improved highly reliable world wide communications system.

Another object of this invention is to provide an over the horizon communications system which utilizes a waveguide duct in the ionosphere to trap electromagnetic radiation.

Still another object of this invention is to create an electromagnetically generated ionized cloud to provide a means for injecting electromagnetic radiation into an ionospheric waveguide duct.

A further object of this invention is to provide a means for extracting electromagnetic radiation trapped within an ionospheric waveguide duct.

In accordance with the communications system of this invention, electromagentic radiation is artificially injected into and trapped within an atmospheric waveguide duct. The trapped radiation then propogates within said atmospheric waveguide duct. The trapped radiation then propogates within said atmospheric waveguide duct around the earth. Devices positioned around the earth's periphery are utilized to receive a portion of trapped radiation either by detecting radiation scattered by natural or artificially generated scaters positioned within the waveguide duct.

Other features and objectives of the communications system of this invention will become apparent from the following description taken in conjunction with the following drawings, wherein.

Figure 1:
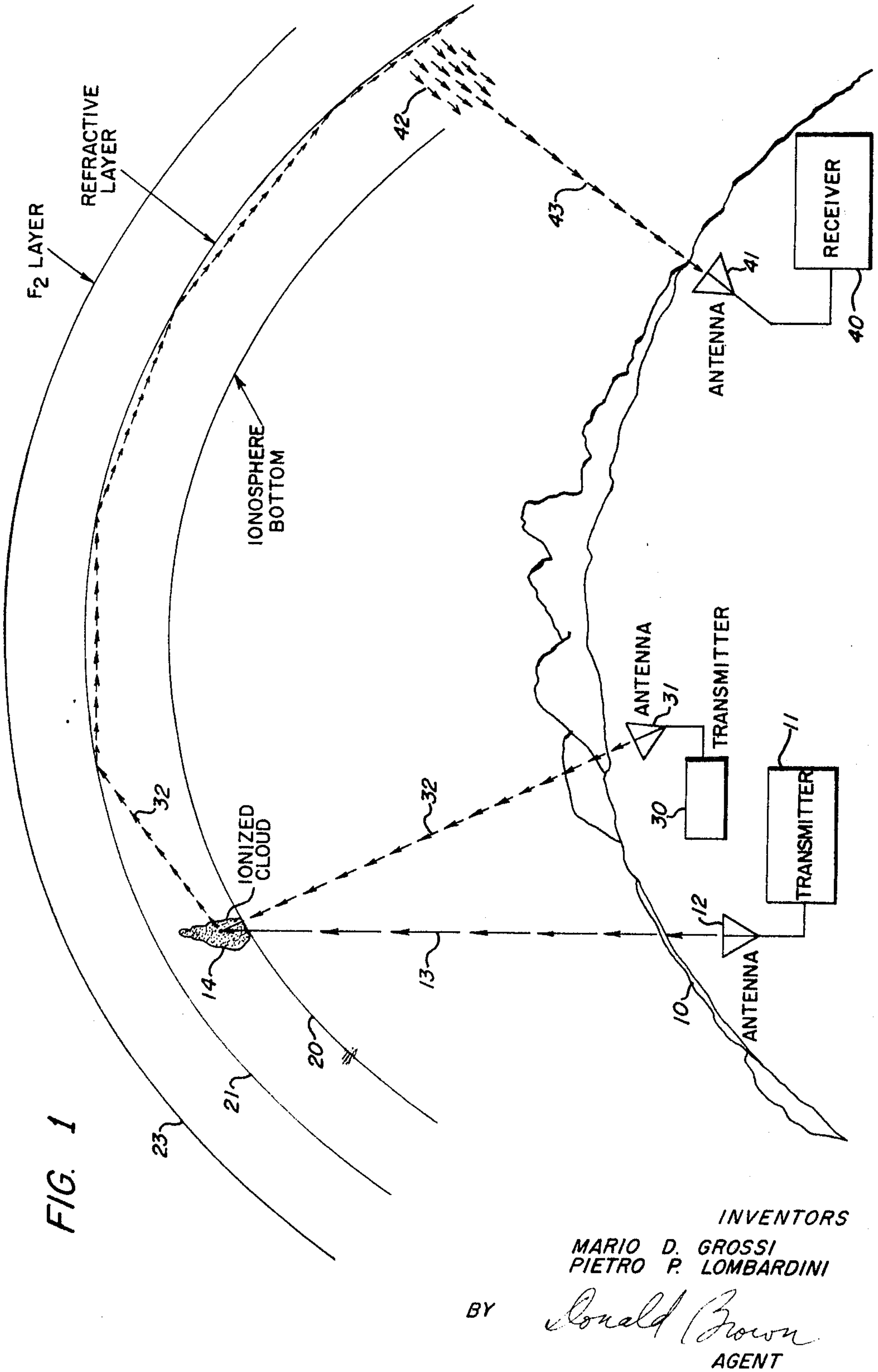
FIG. 1 illustrates schematically a communications system following the principals of this invention including means for generating an artificial scatterer to inject electromagnetic radiation into an ionospheric waveguide duct, and means for receiving a portion of said radiation reflected by natural scatterers.

FIG. 1 illustrates a long distance communications system following the principles of this invention and which comprises a transmitter 11 disposed at a point on the earth 10. The transmitter 11 will be described in conjunction with an explanation of FIGS. 4 and 5. Transmitter 11 provides electromagnetic energy to antenna 12. Antenna 12 then focuses this energy or radiation, shown as arrows 13, to form an ionized cloud or scatterer 14, within the ionospheric region of the atmosphere. A suitable antenna for generating the ionized cloud 14 will be described at a later time in conjunction with the explanation of FIGS. 2, 3, 4 and 5 of the accompanying drawings. The ionized cloud 14 is shown positioned slightly above the ionospheric bottom layer 20, but substantially below the $F_2$ layer 23 of the ionospheric region.

The ionized cloud 14 is believed to be generated in the following manner: electrons that already exist in the ionospheric region of the upper atmosphere are accelerated by electromagnetic radiation which is focused from the ground. These electrons are accelerated by the radiation to a degree such that their kinetic energy reaches the level needed for the occurrence of ionizing collisions. Cloud 14 is a result of these ionizing collisions. Scattering from this cloud takes place due to the discontinuity between this zone of enhanced ionization and the surrounding medium. The shape and the properties of the scatterer can be adjusted by controlling the properties of the antenna used, the amount of power provided by the antenna, and the phase of the energy emitted by various portions of the antenna. For example, the preferred embodiment of this invention utilizes a transmitter 11 and antenna 12 operating at a frequency of 50 megacycles, and which provides 26 megawatts of peak power and 260 kilowatts of average power. Antenna 12 focuses the energy to produce a cloud 14 approximately 80 kilometers above the earth's surface. The ionized cloud formed has a mean width of approximately 15 meters and a length of approximately 60 meters. Due to the focusing, the ionized cloud has a shape which comes to a point at its greatest distance from the earth's surface and tapers in the manner of a cone at its widest point. The ionized cloud of this invention also has a variation of the electric field in the cloud versus the height from the antenna which is positive. The antenna used is in a near-field arrangement. In other words, with increasing distance in the resulting cloud 14 there is an increasing field. This does not happen with an unfocused antenna of the far-field type. An unfocused antenna has a radiation pattern which spreads at greater distances from the antenna and its electric field decreases with increasing range. In our case $dE/dh>0$ where E is the E field vector and $h$ is the distance from the antenna above the earth's surface. It is to be noted that the life of our scatterer or cloud persists essentially as long as the ground transmitter is on. This constitutes a basic advantage with respect to any other suggested artificial scatterer, such as that which could be produced by seeding. Accordingly, this system utilizing an ionized cloud which is generated from the earth and which is controllable from the earth is highly superior to any technique which is completely out of the control of the operators.

Referring once again to FIG. 1, a transmitter 30 is shown for providing a communications signal which is to carry information from a point somewhere on the earth's periphery which is in proximity to transmitter 11. The transmitter 30 could be any of the common A.M. communication transmitters, such as those which operate in the M.F., V.H.F. and H.F. frequency bands. The transmitter 30 provides this communication signal to antenna 31. The antenna 31 is of a directional type in order that the communication signal can be directed towards the ionized cloud or artificial scatterer 14. Directional antennas, such as rhombic or Yagi, could be utilized for this purpose. Assume now that the transmitter 30 provides a 20 megacycle communications signal having a 500 kilowatt peak output power to the antenna 31. This signal will then be directed as shown by the arrowed lines 32, and be refracted off the ionized cloud or scatterer 14. This signal 32 will be directed through the ionospheric waveguide duct, due to a refractive electron layer 21 which curves spherically around and is concentric with the earth's periphery. This refractive layer 21 causes the communication signal 32 to be trapped within an ionospheric waveguide duct which has the refractive layer 21 as its upper boundary, substantially the ionospheric bottom as its lower boundary, and which is concentric with the earth's periphery. The explanation of the presence of this refractive layer and the duct will be given at a later time in conjunction with a description of FIG. 7.

Assuming now a receiving station, such as receiver 40 and antenna 41, located at a site which is at a long distance from transmitter 30, is required to receive information transmitted by transmitter 30. Communication reception at the receiving station is made possible by natural scatterers within the ionospheric layer, such as produced by natural discontinuities in the electron density within the ionosphere. These natural scatterers cause power leakages in the flow of the communications signal 32 through the ionospheric waveguide duct. These power leakages are shown as arrows 42. By utilizing the antenna 41 along with a receiver 40, it is thus possible to detect the power leakages due to scattering caused by natural scatterers within the ionosphere. This is shown diagrammatically as arrow 43 being received by antenna 41. The atenna 41 could be of the Yagi type. The recetiver 40 may be of the double conversion superheterodyne type utilizing two local oscillators and two $I_F$ stages. Thus, it is seen that once a communications signal is injected into the ionosphere and is then trapped in the waveguide duct of the ionopshere, a portion of this trapped signal can then be received after traveling over long distances. It is to be noted that this type of communications link does not depend on local minima or maxima in the ionopshere electron density profile. Furthermore, it is to be noted that this system does not rely upon the reflection of a signal off an ionized cloud and back down to a second location on the earth in order to obtain "one hop" point-to-point communications. Rather, the communications system presented here utilizes ionospherically trapped electromagnetic radiation in order to obtain point-to-point over the horizon communications.

Figures 2, 3, 4, 5:
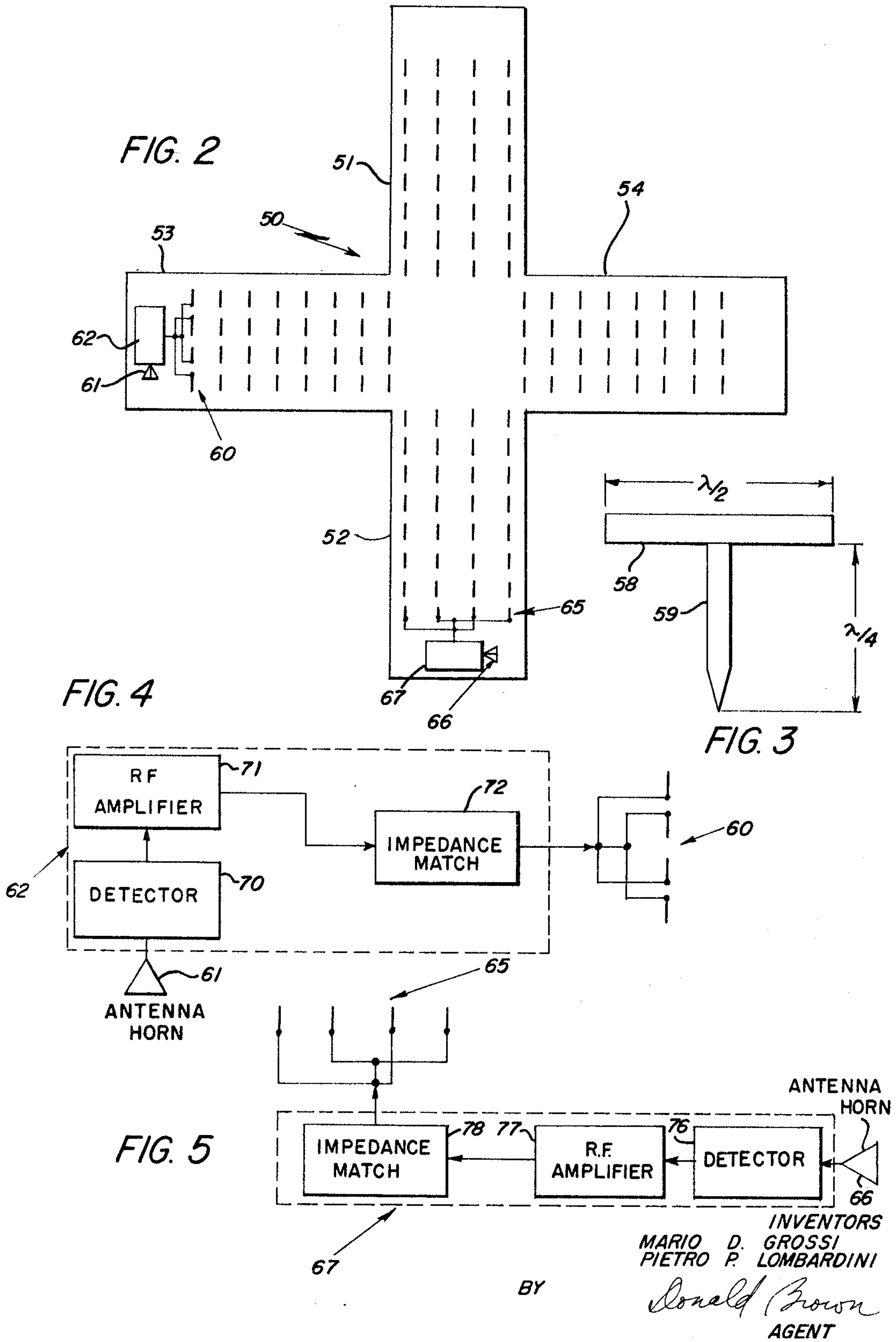
FIG. 2 illustrates a top plan view of a configuration of an antenna for generating an artificial scatterer.
FIG. 3 is a side elevational view of one of dipole elements of the antenna of FIG. 2.
FIG. 4 illustrates schematically the transmitter and the dipole antenna arrangement for the legs numbered 53 and 54 of the antenna of FIG. 2.
FIG. 5 illustrates schematically the transmitter and the dipole antenna arrangement for the legs numbered 51 and 52 of the antenna of FIG. 2.

Referring now to FIGS. 2, 3, 4, 5 and 6 for the description of a transmitter and antenna system shown as transmitter 11 and antenna 12 in FIG. 1. FIG. 2 illustrates the configuration of a Mills Cross antenna for generating the ionized cloud or artificial scatterer 14. This antenna is of that type which is common to the radio astronomy field. A description of this type of antenna can be found in the book "Radio Astronomy," page 75, authored by J. L. Pawsey and R. M. Bracewell, published by Oxford at the Clarendon Press, under the date of 1955 in Oxford, England. An arrangement of this antenna is shown in a top plan view in FIG. 2. This Mills Cross antenna 50 is shown having two legs 51 and 52 and two legs 53 and 54. The width of each of the legs is 12 meters and the length of each leg is 19 kilometers. The total antenna of this invention compriss 104,000 dipoles. A side elevational view of one of the dipoles is shown in FIG. 3 and has a radiating portion 58 which when mounted is parallel to the earth's surface and a vertical portion 59 which is used to mount each of these dipole antennas in the earth's surface. The horizontal radiating portion 58 is designed with a radiating surface equal to $\lambda/_2$ and the mounting portion 59 has a dimension of $\lambda/_4$. Each of the legs 51, 52, 53 and 54 have a total of 26,000 dipoles mounted four across to obtain the configuration shown in FIG. 2. Each of the legs has 6500 rows of four dipole antennas each.

The Mills Cross antenna 50 has the rows of dipoles comprising legs 53 and 54 connected in the same manner. For the purposes of explanation, a four dipole row in leg 53 will be described. This four dipole row is shown as 60 and has a transmitter 62 providing power to be radiated by each of the dipoles. A receiving antenna horn 61 is shown coupled to the transmitter 60 for the purposes of phasing the output radiation from each of the dipole antennas shown in 60. The description of the phasing of the radiation of this antenna will be given in conjunction with an explanation of FIG. 6.

In order to show the connection of the dipole antennas of the legs 51 and 52, a four row dipole antenna configuration 65 is singled out for purposes of description. Dipole antenna row 65 is shown coupled to a transmitter 67 which has an antenna horn 66 which is also used for the purposes of phasing the signal to be radiated by the dipole row 65. Each of the transmitters of the Mills Cross antenna configuration provides a final stage power output of approximately one kilowatt peak power or 10 watts of average power. Since there are a total of 26,000 transmitters in this antenna configuration 50, each providing one kilowatt, a total output power of approximately 26 megawatts peak power is obtained.

Referring now to FIG. 4 for a description of the transmiter 62, a detector 70 is shown coupled to the antenna horn 61 for the purpose of receiving a phasing signal to be retransmitted. The signal to be retransmitted is applied to an R.F. amplifier 71 in order to amplify the detected signal to be retransmitted by the dipole configuration shown as 60. The R.F. amplifier final stage is of the normal tetrode type of amplifier. R.F. amplifier 71 provides an amplified signal which is coupled through an impedance matching device 72 to feed the dipole antenna configuration 60, as schematically shown in FIG. 4. The impedance matching device is utilized in order to couple the R.F. antenna to the dipole configuration 60.

Referring now to FIG. 5, there is disclosed the transmitter 67, having a detector 76, R.F. amplifier 77, and an impedance matching device 78 coupled between an antenna horn 66 and the dipole radiating configuration 65. The apparatus of FIG. 5 is of the same type and operates similarly as does the apparatus of FIG. 4.

Figures 6, 8:
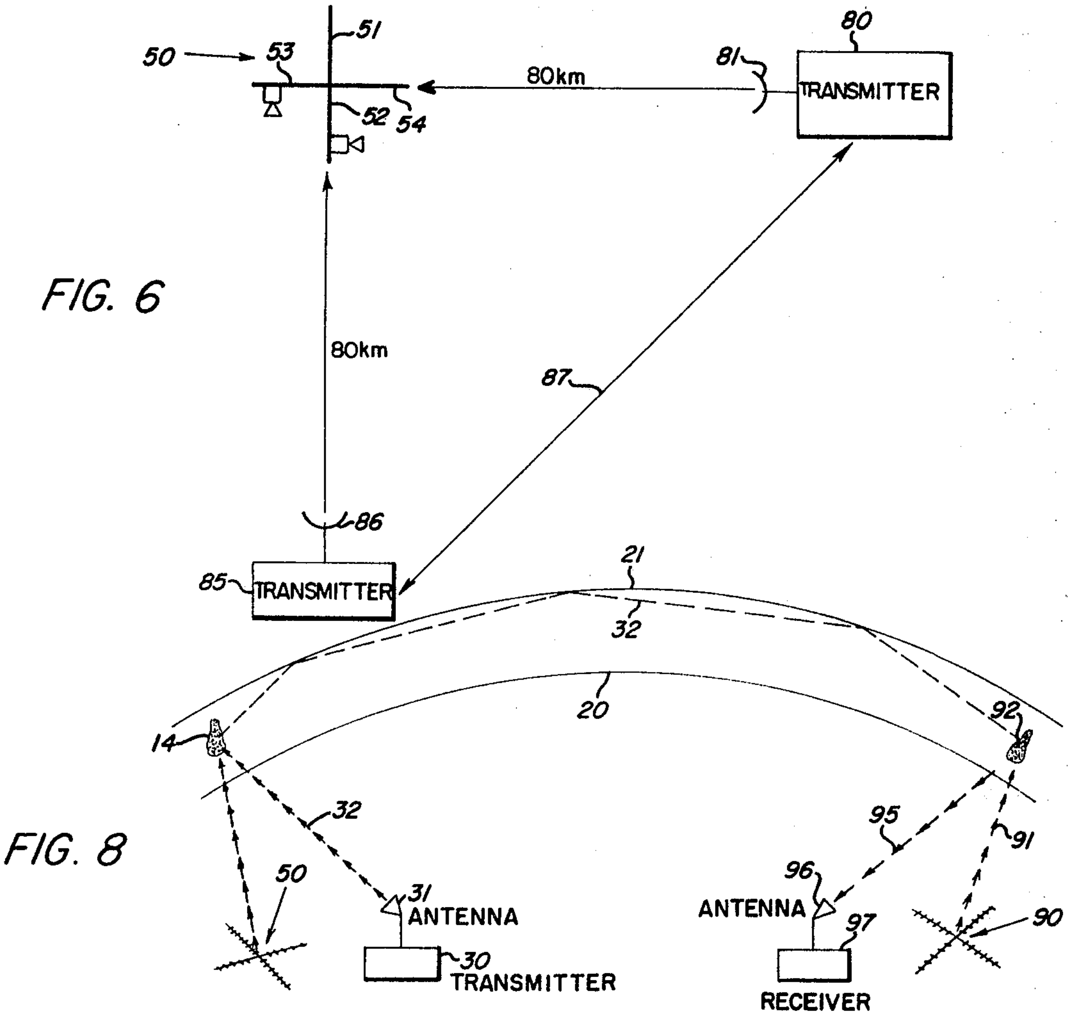
FIG. 6 illustrates schematically a means for properly phasing the output radiation from the antenna of FIG. 2 in order to generate an artificial scatterer positioned within the ionosphere.
FIG. 8 is a schematic diagram of the communications system of this invention including means for generating an artificial scatterer to extract electromagnetic radiation from an ionosphereic waveguide duct.

Referring now to FIG. 6, there is shown a scheme for phasing radiations from each of the dipole antennas of the Mills Cross antenna configuration 50. Although it is possible to pre-set the phase of each of the transmitted signals which emanate from the dipole antennas by individually adjusting the phase of the signal provided by each of the transmitters of the antenna configuration 50, a more effective technique for obtaining the proper phase relationship is shown in FIG. 6. This simplified technique is used to obtain the phase relationship to produce a cloud or artificial scatterer approximately 80 kilometers above the earth's surface. This technique utilizes two transmitters, 80 and 85, which are slaved together by way of a ground link 87. The transmtiters, 80 and 85, simultaneously transmit a signal which emanates in the same phase relationship from each of these transmitters. By placing transmitter 80 perpendicular to and at a distance of approximately 80 kilometers from the legs 51 and 52 and transmitting this signal by way of a parabolic antenna configuration, and by simultaneously positioning transmitter 85 perpendicular to and at a distance of 80 kilometers from legs 53 and 54, and transmitting a signal from a parabolic antenna 86, it is possible to phase the signals radiated by the dipoles of the antenna 50 in order to produce the ionized cloud 14. Thus, for example, by amplitude modulating a microwave frequency signal with a 50 megacycle per second signal, and by detecting this modulation with a detector, such as detector 70 or 76 of FIGS. 4 and 5, and then amplifying this 50 megacycle detected signal, the proper phase relationship for producing the ionized cloud is obtained. The proper phase is obtained since the phase of arrival of the 50 megacycle modulated microwave signal differs from point-to-point along the legs of the antenna configuration 50 in the same phase relationship that is required to recompose the field at 80 kilometers of height.

Figure 7:
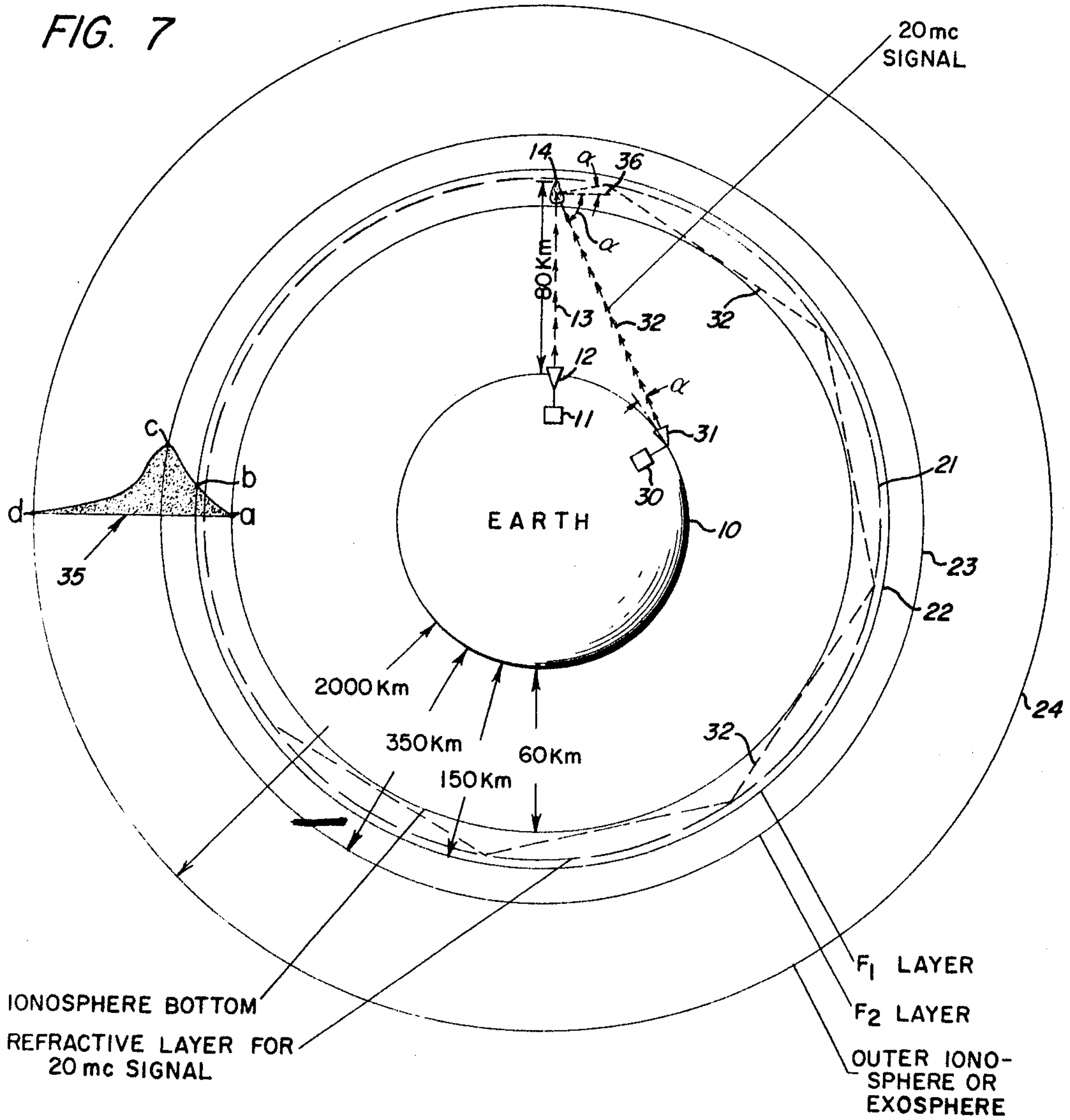
FIG. 7 is a pictorial representation of the earth surrounded by ionospheric layers for the purpose of explaining the presence of ionospheric waveguide ducts.

FIG. 7 is a pictorial representation of the earth surrounded by the ionospheric layers for the purpose of explaining the ionospheric waveguide ducts. For purposes of obtaining a reference from the earth's surface there is presented a pictorial diagram (not to be considered as drawn to scale) showing an ionospheric bottom layer 20 approximately 60 kilometers above the earth's surface, an $F_1$ layer substantially 150 kilometers above the earth's surface, an $F_2$ layer approximately 350 kilometers above the earth's surface, and outer ionosphere or exosphere about 2000 kilometers above the earth's surface. The ionosphere has the shape of a spherical shell and is concentric with the earth's surface.

Referring now to the portion of FIG. 7 numbered 35, this stippled area represents the density of the electrons in the various regions of the ionosphere. For example, point *a* represents an electron density of approximately $10^3$ electrons per cubic centimeter, which occurs at the ionospheric bottom. Point *b* represents the electron density at the $F_1$ layer, which is approximately equal to $10^5$ electrons per cubic centimeter. Point *c* depicts the maximum electron density, which is presumed to exist at the $F_2$ layer of the ionosphere. At this point, an electron density of approximately $10^6$ electrons per cubic centimeter is believed to exist. Point *d* on the tail end of the exponentially decaying region between points *c* and *d* represents an electron density of approximately $10^3$ electrons per cubic centimeter which is considered to exist at the exposure.

Assume now that a transmitter, such as 11, and an antenna 12, which was previously disclosed with relation to FIGS. 1–6, generates an artificial scatterer 14 at approximately 80 kilometers above the earth's surface. Further, assume that a transmitter 30 and an antenna 31 directs a 20 megacycle communications signal in such a manner that the signal leaves the earth at an angle $\alpha$ of approximately 10° so that it is injected at an angle of $\alpha$ degrees into an ionospheric waveguide duct which lies between the bottom layer 20 and the $F_2$ layer 23. The upper limit of the ionspheric waveguide duct, shown as the refractive layer 21 within the ionosphere, is a function of the frequency of the transmitted communications signal and the ionospheric conditions. The index of refraction of the ionosphere refractive layer is, among other things, a function of the local electron density of the ionospheric region and of the frequency of the transmitted communications signal. When the index of refraction approaches 0, refractive bending of a ray toward the earth's surface will take place. However, a trapped ray will not land on the earth's surface. For a 20 megacycle communications signal, a refractive layer 21 theorized at 130 kilometers, comprises the upper limit of the wave guidance duct. The lower limit of the ionospheric waveguide duct is a function of the angle $\alpha$. In the situation required for trapping of the signal 32, the lower limit is substantially bounded by the ionospheric bottom for an $\alpha$ which permits trapping. Therefore, for a 20 megacycle signal, the ionospheric waveguide duct will lie in the region between substantially 60 kilometers at its lower limit to 130 kilometers at its upper limit. For other frequencies, the waveguide duct will vary in accordance with the frequency of the communications signal.

Referring once again to the communications signal 32, it can be seen that this signal 32 will be refracted from the artificial scatterer 14, and be injected into the ionospheric duct, described previously. The signal after entering the duct will be trapped, due to the signal 32 being refracted periodically at points along the upper shell-like refractive layer 21.

FIG. 8 is a schematic diagram of the communication system of this invention including a second artificial scatterer, which is placed in the ionospheric duct in order to extract a comunications signal trapped within the duct. A transmitter 30 and an antenna 31 is shown providing a communications signal 32 which is refracted by a scatterer 14 generated by a Mills Cross antenna 50. This signal 32 is then periodically refracted by a refractive layer 21 and travels parallel to the earth's surface. A second Mills Cross type antenna emitting radiation, shown as arrowed lines 91, places a second artificial scatterer 92 within the ionospheric duct which lies substantially between the ionospheric bottom 20 and the refractive layer 21. This cloud 92 intercepts the communications signal 32 and reflects a major portion thereof. This is shown as arrowed lines 95 which are received by an antenna 96 and a receiver 97. Although this particular embodiment is more costly than that which is shown in FIG. 1, due to the use of two artificial scatterers 14 and 92, this embodiment will provide a communications system which will be operable over long distances at higher data rates. It is to be noted that this two scatter system is not of the "one-hop" reflective type. This system does not require that the artificial scatterers 14 and 92 be within line-of-sight of each other in order that there be over the horizon communications.

Figure 9:
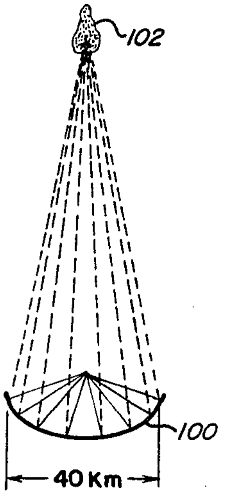
FIG. 9 is a side schematic view of an ellipsoid antenna which could be used to generate an artificial scatterer within the ionosphere.

Referring now to FIG. 9, an alternate embodiment of an antenna is shown for producing an ionized cloud or scatterer, such as cloud 102. The antenna 100 is of the ellipsoidic variety and is designed with a diameter of 40 kilometers to radiate and focus energy to produce the cloud 102.

Although the preferred embodiment shows the use of separate antennas and transmitters to produce the cloud and to provide the communications signal, it is to be understood that a single station comprising a dual purpose antenna and transmitter could be used. Furthermore, it is to be understood that although a 20 megacycle communication signal is used in the preferred embodiment, other frequencies such as M.F., H.F., and V.H.F. frequencies of between approximately a few megacycles to 70 megacycles could be used. For example, recent tests have shown that communications between Massachusetts and Italy are possible utilizing this technique. Instead of generating an artificial scatterer, ionized meteor trails were utilized as scatterers to inject a 23 megacycle signal into an ionospheric waveguide duct. Receivers positioned in Italy detected a portion of the signal trapped within the duct. Additionally, this technique could be applied to satellite-borne receivers orbiting within the ionospheric waveguide duct or between ground stations and satellites. In addition, it is possible to use the trapped radiation technique of this invention in other regions of the atmosphere, such as in the troposphere. A tropospheric communications system would permit the propagation of frequencies in the V.H.F., U.H.F. and S.H.F. bands. Accordingly, it is desired that this invention not be limited except as defined by the appended claims.

We claim:

1. A communications system comprising:
means for generating and controlling an ionized cloud in the ionosphere, said means including first and second transmitters for simultaneously transmitting signals in the same phase relationship, ground link means for slaving said transmitters together, and antenna means for focusing on and accelerating ionospheric electrons with the electromagnetic radiation signals from said transmitters to produce ionizing collisions;
transmitting means for transmitting a communications signal directed at said ionized cloud, said cloud injecting said communications signal into and propagating said communications signal within an ionospheric signal trapping waveguide duct encircling the earth; and
means for receiving at least a portion of said communications signal trapped in the duct.

2. A system comprising:
means for transmitting a signal;
means for electromagnetically generating a scatterer within a given zone of the ionosphere, said scatterer injecting at least a portion of said signal into and causing said portion to propagate within an ionospheric signal trapping waveguide duct encircling the earth; and
means for receiving at least a portion of said signal trapped within said waveguide duct.

3. A system comprising:
means for transmitting a signal into a given zone of the atmosphere;
means for generating a scatterer in a given zone of the atmosphere, said scatterer causing said signal to be injected into and propagated within an atmospheric signal trapping duct to encircle the earth, and
means for detecting at least a portion of said signal trapped within said duct.

4. A system comprising:
means for providing a signal having a frequency below approximately 7 megacycles;
means for injecting at least a portion of said signal into a trapping zone of the ionosphere encircling the earth and defined by the ionospheric bottom layer and a refractive layer which is a function of the frequency of said signal and for causing said portion to propagate within said trapping zone around the earth; and
means for detecting at least a portion of said injected signal.

5. A communications system comprising:
means for providing a signal;
means for electromagnetically generating a scatterer to inject said signal into and to propagate said signal within a given signal trapping zone of the atmosphere encircling the earth; and
means for detecting at least a portion of said injected signal.

6. A communications system in accordance with claim 5 wherein said means for electromagnetically generating a scatterer includes an antenna for focusing on and accelerating ionospheric electrons with electromagnetic radiation signals to produce ionizing collisions.

7. A communications system in accordance with calim 6 wherein said antenna comprises a Mills Cross antenna having first and second perpendicular legs and includes means for phasing said antenna to produce said scatterer comprising first and second transmitters for simultaneously transmitting signals in the same phase relationship, each of said transmitters being perpendicular to and spaced apart from a different one of said legs, and ground link means for slaving said transmitters together.

8. A communications system comprising:
transmitting means for transmitting a communications signal;
transmitting means for electrromagnetically generating a scatterer in a given signal trapping zone in the ionosphere;
an antenna included in said scatterer generating means said scatterer being provided to inject said communications signal into and to propagate said communications signal within a given signal trapping zone of the ionosphere encircling the earth;
means for focusing on and acceleratnig ionospheric electrons with electromagnetic radiation signals to produce ionizing collisions;
means for phasing said antenna to produce said scatterer, said phasing means including first and second transmitters for simultaneously transmitting signals in the same phase relationship;
ground link means for slaving said transmitters together; and
means for receiving at least a portion of said communications signal which has been injected into and propagated within the given signal trapping zone.

9. A system comprising:
means for generating and controlling an ionized cloud including transmitter means for producing signals to accelerate ionospheric electrons and for stopping producing said signals to cause the removal of said cloud;
means for transmitting a signal directed at said cloud, said cloud injecting said signal into and propagating said signal within an ionospheric trapping waveguide duct encircling the earth; and
means for receiving at least a portion of said signal injected into said duct.

10. A system in accordance with claim 9 wherein said means for generating a cloud includes a near-field antenna producing a positive gradient electric field within said cloud at increasing distances from said antenna.

11. A communications system comprising:
means for providing a signal;
means for electromagnetically generating a scatterer within a region of the ionosphere below the ionospheric $F_2$ layer, said scatterer providing means for the injection and the porpagating said signal in a trapping zone of the ionosphere defined by the ionosphere bottom layer and a refractive layer which is a function of the frequency of said signal; and means for receiving at least a portion of said trapped signal.

12. A communications system comprising:

means for transmitting a communications signal;

means for electromagnetically generating and controlling a scatterer within a given region of the ionosphere below the ionosphere $F_2$ layer, said scatterer being provided to inject said communication signal into and to propagate said communications signal within a trapping zone of the ionosphere defined by the ionospheric bottom layer and a refractive layer which is a function of the frequency of said communications signal;

said scatterer generating means including first and second transmiters for simultaneously transmitting signals in the same phase relationship, ground link means for slaving said transmitters together, and a near-field antenna for producing a positive gradient electric filed within the scatterer at increasing distances from the antenna; and means for receiving at least a portion of the communications signal in said trapping zone.

13. A system in accordance with claim 11 including a second electromagnetically generated scatterer positioned within the zone of the ionosphere defined by the ionospheric bottom layer and said refractive layer, said scatterer providing means for extracting at least a portion of said signal trapped within said ionosphere.

14. A communications system comprising:

means for providing a signal having a frequency between a few megacycles to about 70 megacycles;

means for electromagnetically generating a scatterer within a given region of the ionosphere including transmitter means for producing signals to accelerate ionospheric electrons, said scatterer providing for the trapping of and the propagating of said signal within a given region of the ionosphere defined by the ionospheric bottom layer and a refractive layer which is a function of the frequency of said signal;

means for electromagnetically generating a second scatterer within a given region of the ionosphere to extract at least a portion of said signal including transmitter means for producing signals to accelerate ionospheric electrons; and means for detecting at least a portion of said extracted signal.

15. A communications system comprising:

means for generating and controlling an ionized cloud in the ionosphere, said means including one transmitting means for simultaneously transmitting signals in a suitable phase relationship to achieve focusing of the radio frequency generated by the transmitting means, means for slaving the signals from said transmitting means and antenna means for focusing on and accelerating ionospheric electrons with the electromagnetic radiation signals from said transmitting means to produce ionizing collisions;

another transmitting means for transmitting a communications signal directed at said ionized cloud, said cloud injecting said communications signal into and propagating said communications signal within an ionospheric signal trapping waveguide duct encircling the earth; and means for receiving at least a portion of said communications signal trapped in the duct.

16. A system comprising:

means for transmitting a signal;

means for electromagnetically generating a scatterer for injecting at least a portion of said signal into a trapping zone of the ionosphere encircling the earth, said zone defined by a lower boundary which is a function of the angle of injection of the signal into the zone and a upper refractive layer boundary which is a function of the frequency of said signal and for causing said portion to propagate within said trapping zone around the earth without any lower boundary reflections; and means for receiving at least a portion of said signal trapped within said zone.

17. A system comprising:

means for transmitting a signal;

means for electromagnetically generating a scatterer for injecting at least a portion of said signal into a trapping zone of the ionosphere, said zone limited by an upper refractive layer which is a function of the frequency of said signal and for causing said portion to propagate within said trapping zone around the earth with reflections only off of the upper refractive layer; and means for receiving at least a portion of said signal trapped within said zone.

18. A system comprising:

means for transmitting a signal;

a scatterer injecting at least a portion of said signal into a trapping zone of the ionosphere encircling the earth, said zone defined by a lower boundary which is a function of the angle of injection of the signal into the zone and an upper refractive layer boundary which is a function of the frequenncy of said signal and for causing said portion to propagate within said trapping zone around the earth without any lower boundary reflections; and means for detecting at least a portion of said injected signal.

19. A system comprising:

means for transmitting a signal;

a scatter injecting at least a portion of said signal into a trapping zone of the ionosphere, said zone limited by an upper refractive layer which is a function of the frequency of said signal and causing said portion to propagate within said trapping zone around the earth with reflections only off of the upper refractive layer; and means for detecting at least a portion of said injected signal.

20. A communications system comprising:

means for providing a signal;

means for electromagnetically generating a permanent and controllable scatterer to inject said signal into and to propagate said signal within a given signal trapping zone of the ionosphere encircling the earth, and means for detecting at least a portion of said injected signal.

21. A method of communicating comprising the steps of:

electromagnetically generating a scatterer in a given zone of the atmosphere;

transmitting a signal into said scatterer in such manner that said signal is injected into and propagated within an atmospheric signal trapping duct encircling the earth; and detecting at least a portion of said signal trapped within said duct.

22. A method of communicating comprising the steps of:

electromagnetically generating a scatterer within a given zone of the ionosphere;

transmitting a signal into said scatterer in such manner that at least a portion of said signal is injected into and propagated within an ionospheric signal trapping waveguide duct encircling the earth; and receiving at last a portion of said signal trapped within said waveguide duct.

23. A method of communicating comprising the steps of:

transmitting a communications signal;

injecting at least a portion of said signal into a signal trapping zone of the atmosphere encircling the earth, said zone defined by a lower boundary which is a functon of the angle of injection of the signal into the zone and an upper shell-like refractive layer boundary which is a function of said signal, said signal being periodically refracted at points along the upper shell-like refractive layer without any lower boundary reflections as it is propagated approximately parallel to the earth's surface; and receiving at least a portion of the signal propagating within said trapping zone.

24. A method of communicting using trapped electromagnetic radiation comprising the steps of:

transmitting a signal having a frequency below approximately 70 megacycles;

injecting at least a portion of said signal into a trapping zone of the ionosphere encircling the earth and defined by the ionosphere bottom layer and a refractive layer which is a function of the frequency of said signal;

propagating said signal within said trapping zone around the earth; and detecting at least a portion of said propagated signal.

25. A method of communicating using ionizing atmospheric collisions comprising the steps of:

electromagnetically generating a scatterer in a given zone of the atmosphere;

providing a communications signal which said scatterer injects into and propagates within the given signal trapping zone encircling the earth; and detecting at least a portion of said propagated signal.

26. A method in accordance with Claim 25 wherein the step of electromagnetically generating the scatterer includes:

focusing electromagnetically radiation signals on atmospheric electrons within said given zone; and accelerating the electrons with the electromagnetic radiation signals to produce ionizing collisions.

27. A method in accordance with Claim 26 wherein the steps of focusing and accelerating include:

simultaneously transmitting identically phased signals;

slaving said phased signals together; and phasing an antenna to achieve the focusing and accelerating of the electrons to produce the ionizing collisions.

28. A method of communicating comprising tne steps of:

generating an ionized cloud with electromagnetic radiation signals;

controlling said cloud by said signals;

transmitting a communication signal directed at said cloud such that said communication signal is injected into and propagated within an ionospheric signal trapping waveguide duct encircling the earth; and receiving at least a portion of said communication signal which has been injected into and propagated within said duct.

29. A method of communicating comprising the steps of:

electromagnetically generating a scatterer within a region of the ionosphere below the ionospheric $F_2$ layer;

transmitting a communication signal into said scatterer to inject into and propagate said signal within a signal trapping zone of the ionosphere defined by the ionospheric bottom layer and a refractive layer which is a function of the signal frequency; and receiving at least a portion of said trapped signal.

30. The method of claim 29 wherein said receiving step includes:

electromagnetically generating a second scatterer positioned within the zone of the ionosphere defined by the ionospheric bottom layer and said refractive layer in order to provide means for extracting at least a portion of said trapped signal.

31. A method of communicating comprising the steps of:

electromagnetically generating a scatterer within a given region of the ionosphere;

transmitting a communications signal having a frequency between a few megacycles to about 70 megacycles into said scatter causing the signal to be trapped and propagated within the given region of the ionosphere defined by the ionospheric bottom layer and refractive layer which is a function of the frequency of the signal;

electromagnetically generating a second scatterer within the given region of the ionosphere in order to permit extraction of at least a partion of said signal; and detecting at least a portion of said extracted signal.

32. A method of communicating comprising the steps of:

electromagnetically generating an ionized cloud in the ionosphere;

controlling said cloud by simultaneously transmitting signals in a suitable phase relationship to achieve focusing of the radio frequency generated, slaving the transmitted signals together and focusing on and accelerating ionospheric electrons with the electromagnetic radiation signals to produce ionizing collisions;

transmitting a communications signal directed at said ionized cloud to inject into and propagate said communications signal within an ionospheric signal trapping waveguide duct encircling the earth; and receiving at least a portion of said communications signal trapped in the duct.

33. A method of communicating comprising the steps of:

electromagnetically generating a scatterer within a given region of the ionosphere;

transmitting a communications signal into said scatterer to inject at least a portion of said signal into and propagate it within a trapping zone of the ionosphere defined by a lower boundary which is a function of the angle of injection of the signal into the zone and an upper refractive layer boundary which is a function of the frequency of said signal, the propagation occurring without any lower boundary reflections; and receiving at least a portion of said signal trapped within said zone.

34. A method of communicating comprising the steps of:

electromagnetically generating a scatterer within a given region of the ionosphere;

transmitting a communications signals into said scatterer to inject at least a portion of said signal into and propagate it within a trapping zone of the ionosphere limited by an upper refractive layer which is a function of the frequency of said signal, the propagation occurring with reflections only off of the upper refractive layer; and receiving at least a portion of said signal trapped within said zone.

35. A method of communicating comprising the steps of:

electromagnetically generating a permanent and controllable scatterer in a given zone of the atmosphere;

directing a communications signal into said scatterer to inject said signal into and to propagate said signal within the given zone of the atmosphere; and detecting at least a portion of said injected signal.

36. A communications system as set forth in claim 15 wherein said antenna is employed in a near-field arrangement.

37. A communications system as set forth in claim 36 where:

said antenna comprising a Mills Cross antenna having first and second sets of perpendicular legs; and said one transmitting means comprises first and second transmitters for simultaneously transmitting signals in the same phase relationship, each of said transmitters being perpendicular to and spaced apart from a different one of said legs.

38. A communications system as set forth in claim 37 wherein:

each of said antenna legs has a width of approximately twelve meters and a length of approximately nineteen kilometers;

said antenna has a horizontal radiating surface equal to one half wavelength and a mounting portion of one quarter wavelength; and said first and second transmitters each being spared approximately 80 kilometers from the corresponding legs of said antenna and each having a parabolic transmitting antenna.

39. A communications system as set forth in claim 38 wherein:

said ionized cloud is located approximately 80 kilometers above the earth's surface, has a mean width of approximately 15 meters, a length of approximately 60 meters and tapers in a cone-shaped fashion from its widest portion to a point at its greatest distance from the earth's surface.

40. A communicating system as set forth in claim 15 wherein:

said another transmitting means transmits a communications signal having a frequency between a few megacycles to about 70 megacycles; and said transmitting means including a transmitter and an antenna, said antenna being of the directional type.

41. A communications system as set forth in claim 40 wherein:

said antenna is a rhombic antenna.

42. A communications system as set forth in claim 40 wherein:

said antenna is a yagi antenna.

43. A communications system as set forth in claim 40 wherein:

said directional antenna is positioned so that the communications signal leaves the earth at an angle $\alpha$ of approximately 10° and the angle of injection into said duct is approximately $\alpha$.

44. A communications system as set forth in claim 15 wherein:

said receiving means includes a receiver, said receiver being a double conversion superheterodyne receiver having two oscillators and two IF stages and a receiving antenna.

45. A communications system as set forth in claim 44 wherein:

said receiving antenna being a yagi antenna.

46. A communications system comprising:

means for generating and controlling an ionized cloud in the ionosphere, said means including one transmitting means for simultaneously transmitting signals in a suitable phase relationship to achieve focusing of the radio frequency generated by the transmitting means, means for slaving the signals from said transmitting means and antenna means for focusing on and accelerating ionospheric electrons with the electromagnetic radiation signals from said transmitting means to produce ionizing collisions;

another transmitting means for transmitting a communications signal directed at said ionized cloud, said cloud injecting said communications signal into and propagating said communications signal within an ionospheric signal trapping waveguide duct encircling the earth;

means for generating and controlling a second ionized cloud within said duct to extract at least a portion of said signal including means for producing signals to accelerate ionospheric electrons; and means for detecting at least a portion of the signal intercepted by said second cloud.

47. A communications system comprising:

means for generating and controlling an ionized cloud within a given zone of the ionosphere, said means including, one transmitting means comprising first and second transmitters for simultaneously transmitting electromagnetic radiation signals in the same phase relationship to achieve focusing of the radio frequency generated by the transmitting means, means for slaving the signals from said transmitters, antenna means for focusing on and accelerating ionospheric electrons with the signals from said transmitting means to produce ionizing collisions, said means comprising an antenna employed in a near-field arrangement and being a Mills Cross antenna having first and second sets of perpendicular legs, each of said transmitters being perpendicular and spaced apart from a different one of said sets of legs;

another transmitting means including a transmitter and a directional antenna for transmitting a communications signal having a frequency between a few megacycles to about 70 megacycles and directed at said ionized cloud, said cloud injecting at least a portion of said communications signal into and propagating within an ionospheric signal trapping zone encircling tne earth, said zone defined by a lower boundary which is a function of the angle of injection of the signal into the zone and an upper shell-like refractive layer boundary which is a function of the frequency of said communications signal, said signal being periodically refracted at points along the upper shell-like refractive layer without any lower boundary reflections as it is propagated approximately parallel to the earths surface;

means for generating and controlling a second ionized cloud within said zone to extract at least a portion of said communications signal including means for producing signals to accelerate ionospheric electrons; and means for receiving at least a portion of said communications signal trapped witnin said zone.

48. A communications system as set forth in claim 47 wherein:

each of said antenna legs has a width of approximately 12 meters and a length of approximately 19 kilometers;

said antenna has a horizontal radiating surface equal to one half wavelength and a mounting portion of one quarter wavelength; and said first and second transmitters each being spaced approximately 80 kilometers from the corresponding legs of said antenna and each having a parabolic transmitting antenna.

49. A communications system as set forth in claim 48 wherein:

said ionized cloud is located approximately 80 kilometers above the earths surface, has a mean width of approximately 15 meters, a length of approximately 60 meters and tapers in a cone-shaped fashion from its widest portion to a point at its greatest distance from the earth's surface.

50. A communications system as set forth in claim 47 wherein:

said directional antenna is positioned so that the communications signal leaves the earth at an angle $\alpha$ of approximately 10° and the angle of injection into said zone is approximately α.

51. A communications system as set forth in claim 47 wherein:

said receivng means includes a receiver, said receiver being a double conversion superheterodyne receiver having two oscillators and two IF stages and a receiving antenna.

52. A communications system as set forth in claim 51 wherein:

said receiving antenna being a yagi antenna.

53. A communications system as set forth in claim 47 wherein:

said second cloud generating and controlling means includes, one transmitting means comprising first and second transmitters for simultaneously transmitting electromagnetic radiation signals in the same phase relationship to achieve focusing of the radio frequency generated by the transmitting means, means for slaving the signals from said transmitters;

antenna means for focusing on and accelerating ionospheric electrons with the signals from said transmitting means to produce ionizing collisions, said means comprising an antenna employed in a near-field arrangement and being a Mills Cross antenna having first and second sets of perpendicular legs, each of said transmitters being perpendicular and spaced apart from a different one of said sets of legs.

54. A communications system as set fortn in claim 49 wherein:

said Mills Cross antennas each operate at a frequency of approximately 50 megacycles and provide approximately 26 negawatts of peak power and 260 kilowatts of average power.

55. A communications system as set forth in claim 47 wherein:

both said cloud generating and controlling means as well as said communications signal transmitting and receiving means are located near the earths surface.

56. A communications system as set forth in claim 47 wherein:

the lower boundary of said zone is substantially bounded by the ionospheric bottom layer which is approximately 60 kilometers above the earths surface and the upper boundary is substantially bounded by the ionospheric $F_2$ layer, which is approximately 350 kilometers above the earths surface.

57. A communications system as set forth in claim 36 wherein:

said antenna is an ellipsoidic antenna having a diameter of approximately 40 kilometers.

References Cited

UNITED STATES PATENTS

| | | | |
|---|---|---|---|
| 2,871,344 | 1/1959 | Busibries | 343—100.4 |
| 3,030,500 | 4/1962 | Katzin | 343—100 |
| 3,189,901 | 5/1965 | Cutolo | 343—100 |

OTHER REFERENCES

Terman, Frederick E.: Electronic and Radio Engineering, fourth ed., 1955, pp. 834–5 relied on.

RODNEY D. BENNETT, Jr., *Primary Examiner.*

J. P. MORRIS, *Assistant Examiner.*